United States Patent
Jung et al.

(10) Patent No.: US 12,315,180 B2
(45) Date of Patent: May 27, 2025

(54) DEPTH ESTIMATION METHOD AND APPARATUS USING LEARNING MODEL

(71) Applicants: Electronics and Telecommunications Research Institute, Daejeon (KR); The Trustees of Indiana University, Indianapolis, IN (US)

(72) Inventors: Soon-heung Jung, Daejeon (KR); Jeongil Seo, Daejeon (KR); David Crandall, Bloomington, IN (US); Md Alimoor Reza, Bloomington, IN (US)

(73) Assignees: ELECTRONICS AND TELECOMMUNICATIONS RESEARCH INSTITUTE, Daejeon (KR); THE TRUSTEES OF INDIANA UNIVERSITY, Indianapolis, IN (US)

( * ) Notice: Subject to any disclaimer, the term of this patent is extended or adjusted under 35 U.S.C. 154(b) by 362 days.

(21) Appl. No.: 17/535,921

(22) Filed: Nov. 26, 2021

(65) Prior Publication Data
US 2023/0169671 A1    Jun. 1, 2023

(51) Int. Cl.
G06K 9/00 (2022.01)
G06T 7/593 (2017.01)
G06V 10/77 (2022.01)

(52) U.S. Cl.
CPC .......... *G06T 7/593* (2017.01); *G06V 10/7715* (2022.01); *G06T 2207/20081* (2013.01); *G06T 2207/20084* (2013.01)

(58) Field of Classification Search
CPC . G06T 2207/20084; G06T 2207/20081; G06T 7/593; G06T 2207/10012; G06T 2207/10028; G06T 7/50; G06T 2207/30252; G06T 2207/10024; G06T 7/70; G06T 2207/20076; G06T 2207/20016; G06T 3/4007; G06T 7/11; G06T 7/55; G06T 2207/20228; G06T 2207/30244; G06T 3/40; G06T 2207/10016; G06T 3/02; G06N 3/045;
(Continued)

(56) References Cited

U.S. PATENT DOCUMENTS 8,208,716 B2  6/2012  Choi et al.
8,588,515 B2  11/2013  Bang et al.
(Continued)

OTHER PUBLICATIONS

Jia-Ren Chang et al.: "Pyramid Stereo Matching Network." Proceedings of the IEEE conference on computer vision and pattern recognition, 2018, pp. 5410-5418.
(Continued)

*Primary Examiner* — Alex Kok S Liew
(74) *Attorney, Agent, or Firm* — KILE PARK REED & HOUTTEMAN PLLC (57) ABSTRACT

A depth estimation method and apparatus using a learning model are disclosed. A depth information estimation method may include identifying a plurality of image data, generating feature maps of the plurality of image data respectively, generating a cost volume using the feature maps, generating normalized cost volumes in different sizes by normalizing the cost volume, estimating disparity information from the normalized cost volumes, and generating depth information using the estimated disparity information.

13 Claims, 6 Drawing Sheets

(58) Field of Classification Search
CPC ............ G06N 3/08; G06N 3/084; G06N 7/01; G06N 3/044; G06N 3/048; G06N 3/088; G06N 20/00; G06N 3/04; G06N 20/20; G06N 20/10
See application file for complete search history.

(56) References Cited

U.S. PATENT DOCUMENTS

| | | |
|---|---|---|
| 10,832,432 B2 | 11/2020 | Anisimovskiy et al. |
| 2018/0211401 A1 | 7/2018 | Lee et al. |
| 2020/0134848 A1* | 4/2020 | El-Khamy ............. H04N 23/45 |
| 2020/0160546 A1* | 5/2020 | Gu ............................ G06T 3/18 |

OTHER PUBLICATIONS

Xiaogang Jia et al.: "A Joint 2D-3D Complementary Network for Stereo Matching." Sensors 21.4 (Feb. 18, 2021): 1430.
Jia-Ren Chang et al., "Pyramid Stereo Matching Network", CVPR, 2018, pp. 5410-5418.
Anonymous, "Stereo Matching Network with Densely Connected 3D Convolution", Anonymous CVPR 2021 submission, 2021, Paper ID 10760; pp. 1-9.
Sameh Khamis et al., "StereoNet: Guided Hierarchical Refinement for Real-Time Edge-Aware Depth Prediction", ECCV, 2018, pp. 1-18.
Zhelun Shen et al., "CFNet: Cascade and Fused Cost Volume for Robust Stereo Matching", CVPR, 2018, pp. 13906-13915.

* cited by examiner

DEPTH ESTIMATION METHOD AND APPARATUS USING LEARNING MODEL

BACKGROUND

1. Field of the Invention

One or more example embodiments relate to a depth estimation method and apparatus using a learning model, more particularly, a method of estimating depth information of a two-dimensional (2D) image to reconstruct a three-dimensional (3D) image from a plurality of 2D images.

2. Description of the Related Art

A technology of reconstructing a 3D image based on a 2D image is a subject that has been studied for a long time in the field of computer vision. Recently, in accordance with developments in artificial intelligence, reconstructing a 3D image from a 2D image by applying a machine learning technology is being actively studied.

A method of estimating depth information (or, depth map) which is the information on a distance from a viewpoint of a 2D image to a surface of an object is required for reconstructing a 3D image.

SUMMARY

Example embodiments provide a method and apparatus for estimating accurate depth information from a plurality of 2D images using a learning model.

According to an aspect, there is provided a depth information estimation method including identifying a plurality of image data, generating feature maps of the plurality of image data respectively, generating a cost volume using the feature maps, generating normalized cost volumes in different sizes by normalizing the cost volume, estimating disparity information from the normalized cost volumes, and generating depth information using the estimated disparity information.

The generating of the cost volume may include generating the cost volume by processing the feature maps using a spatial pyramid pooling module.

The generating of the normalized cost volumes in different sizes may include extracting a feature map of the cost volume from the cost volume, downsampling the feature map of the cost volume, and generating the normalized cost volumes in different sizes by upsampling the downsampled feature map of the cost volume.

The estimating of the disparity information may include reducing a number of channels of the normalized cost volumes and upsampling to match resolutions of the normalized cost volumes and determining the disparity information using the upsampled normalized cost volumes.

The generating of the depth information may include converting the disparity information to the depth information based on a focal length of a camera that collects the image data and a center distance between cameras.

According to an aspect, there is provided a method of training a learning model used for a depth information estimation method, the method including identifying a plurality of image data and actual disparity information of the plurality of image data, generating feature maps of the plurality of image data respectively, generating a cost volume using the feature maps, generating normalized cost volumes having different resolutions by normalizing the cost volume, estimating expected disparity information from the normalized cost volumes, determining a difference between the actual disparity information and expected disparity information, and updating a weight of the learning model based on the difference.

The generating of the cost volume may include generating the cost volume by processing the feature maps using a spatial pyramid pooling module.

The generating of the normalized cost volumes having different resolutions may include extracting a feature map of the cost volume from the cost volume, downsampling the feature map of the cost volume, and generating the normalized cost volumes having different resolutions by upsampling the downsampled feature map of the cost volume.

The estimating of the disparity information may include upsampling the normalized cost volumes to match resolutions of the normalized cost volumes and determining the disparity information using the upsampled normalized cost volumes.

According to an aspect, there is provided a depth information estimation apparatus including a processor, wherein the processor may be configured to identify a plurality of image data, generate feature maps of the plurality of image data respectively, determine a cost volume using the feature maps, generate normalized cost volumes in different sizes by normalizing the cost volume, estimate disparity information from the normalized cost volumes, and generate depth information using the estimated disparity information.

The processor may be configured to generate the cost volume by processing the feature maps using a spatial pyramid pooling module.

The processor may be configured to extract a feature map of the cost volume from the cost volume, downsample the feature maps of the cost volume, and generate the normalized cost volumes having different resolutions by upsampling the feature maps of the downsampled cost volumes.

The processor may be configured to upsample the normalized cost volumes to match resolutions of the normalized cost volumes and determine the disparity information using the upsampled normalized cost volumes.

The processor may be configured to convert the disparity information to the depth information based on a focal length of a camera that collects the image data and a center distance between cameras.

Additional aspects of example embodiments will be set forth in part in the description which follows and, in part, will be apparent from the description, or may be learned by practice of the disclosure.

According to example embodiments, accurate depth information may be estimated from the plurality of 2D images using a learning model.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
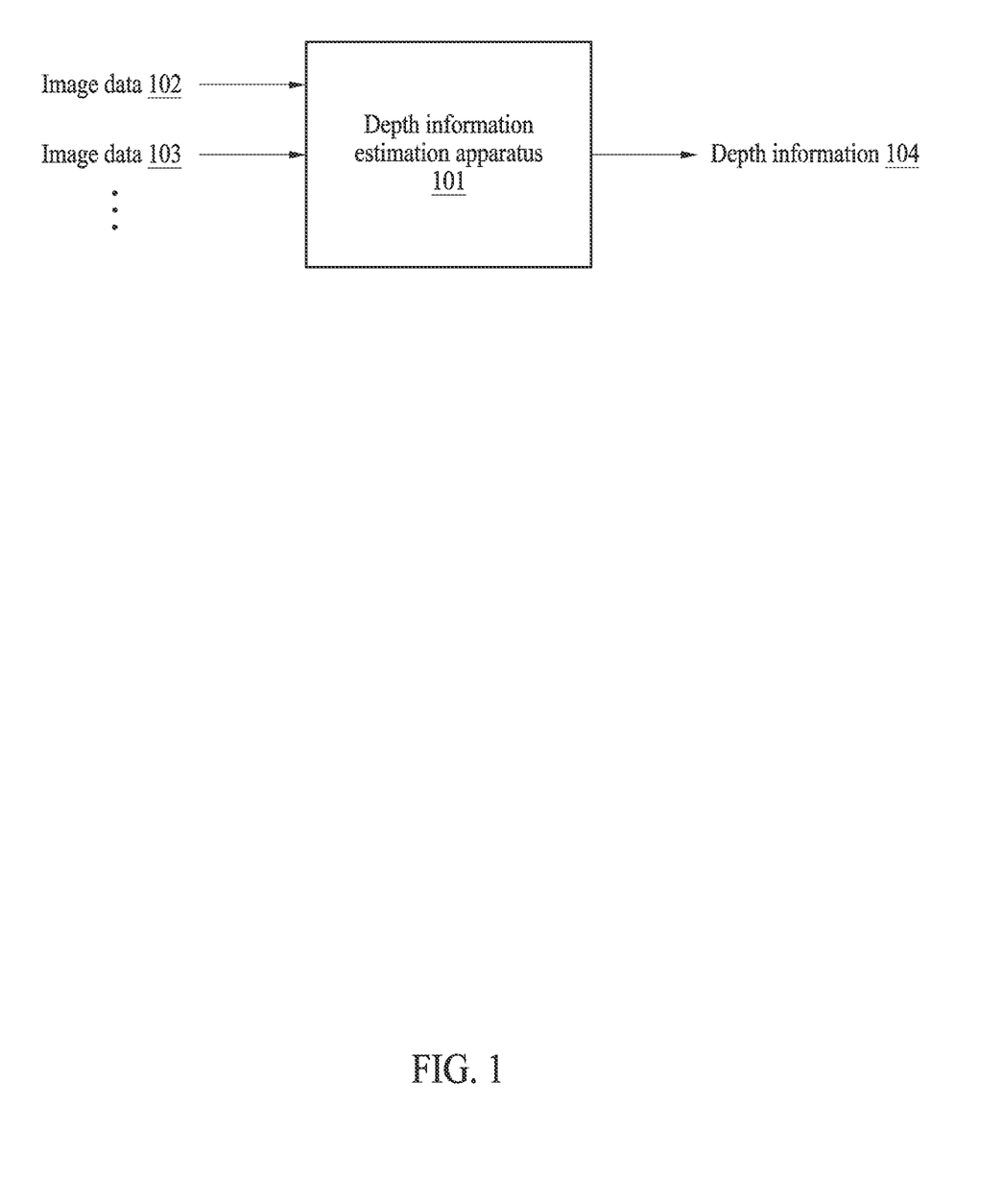
FIG. 1 is a diagram illustrating a depth information estimation apparatus according to an example embodiment.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure. FIG. 1 is a diagram illustrating a depth information estimation apparatus 101 according to an example embodiment.

The present disclosure is for estimating depth information using a learning model in reconstructing a three-dimensional (3D) image from a plurality of two-dimensional (2D) images. Depth information 104 may be accurately determined by a learning model of the present disclosure.

Referring to FIG. 1, the depth information estimation apparatus 101 may determine the depth information 104 using a plurality of image data 102 and 103. The depth information estimation apparatus 101 may include a processor and operations performed in the present disclosure may be performed by the processor.

In FIG. 1, the image data 102 and 103 may be 2D images having predetermined lengths. The image data may be 2D images of a same scene collected by cameras at different positions. For example, the image data 102 and the image data 103 may be a left-sided image and a right-sided image of a stereo image respectively. The depth information 104 may be the depth information 104 of a 3D scene corresponding to the image data and may include a distance from a camera viewpoint by each pixel included in the 3D scene.

The learning model may be a deep learning-based neural network model including an input layer, a hidden layer, and an output layer. The hidden layer may include a plurality of layers that process image data and each layer may include a plurality of weights. Image data may be identified in the input layer and the depth information may be output in the output layer. Operations processed in each layer may be processed by the processor.

The learning model may be any of diverse types of neural network model such as a convolutional neural network (CNN) and a recursive neural network (RNN). A method of training the learning model is described in FIG. 6. The learning model implemented in the present disclosure is not limited to a specific example type and may be implemented in a variety of forms. A structure and operation of the learning model of the present disclosure is described in FIG. 2.

Figure 2:
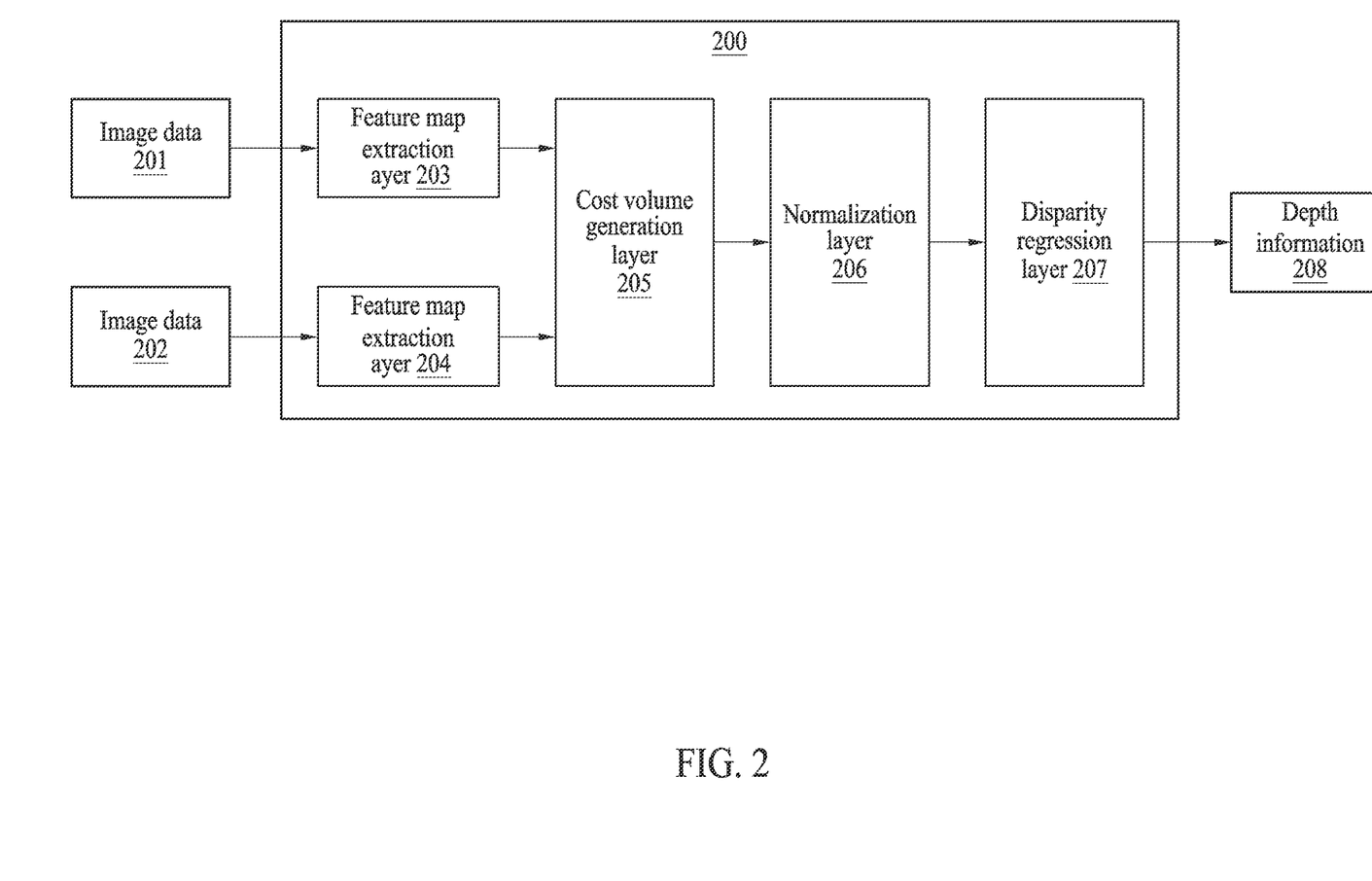
FIG. 2 is a block diagram illustrating a structure of a learning model according to an example embodiment.

FIG. 2 is a block diagram illustrating a structure of a learning model 200 according to an example embodiment.

A hidden layer of the learning model 200 may include feature map extraction layers 203 and 204, a cost volume generation layer 205, a regularization layer 206, and a disparity regression layer 207. A depth information estimation apparatus may estimate depth information 208 by performing operations in each layer of FIG. 2.

The feature map extraction layers 203 and 204 may include layers of 2D CNNs. For example, the feature map extraction layers 203 and 204 may include one or more of convolution layers and pooling layers. The feature map extraction layers 203 and 204 may include same weights.

The depth information estimation apparatus may generate a feature map of image data 201 by extracting a feature of the image data 201 in the feature map extraction layer 203. The depth information estimation apparatus may generate a feature map of image data 202 by extracting a feature of the image data 202 in the feature map extraction layer 204.

In the feature map extraction layers 203 and 204, the depth information estimation apparatus may determine a feature map by processing the image data 201 and 202 using weights included in the feature map extraction layers 203 and 204.

The depth information estimation apparatus may generate a cost volume in the cost volume generation layer 205 using the feature maps generated in the feature map extraction layers 203 and 204. The cost volume may be represented by a 4D matrix including a channel, a disparity, a height and a width.

The depth information estimation apparatus may generate a cost volume by processing the feature maps using a spatial pyramid pooling module in the cost volume generation layer 205. For example, when the image data 201 and 202 are stereo images, the depth information 208 estimation apparatus may generate a cost volume by applying spatial pyramid pooling to the feature maps generated by the image data 201 and 202. For example, the cost volume generation layer 205 may generate a cost volume by combining the feature maps processed by using the spatial pyramid pooling module. For example, feature maps in different sizes may be generated by processing the feature maps based on the spatial pyramid pooling module in the cost volume generation layer 205. In the spatial pyramid pooling module, the feature maps in different sizes may be merged. For example, in the spatial pyramid pooling module, the feature maps in different sizes may be respectively processed using a convolutional layer and may be merged by upsampling. The spatial pyramid pooling module may generate a feature map into which the feature maps in different sizes are merged by processing the feature maps.

The cost volume generation layer 205 may generate a cost volume by merging feature maps processed by the spatial pyramid pooling module.

The term spatial pyramid pooling may refer to generating an ID feature vector by combining feature maps generated by pooling a 2D feature map with windows in different sizes. For example, the 2D feature map may be pooled with a 1×1 window; a 2×2 window; and a 4×4 window: The depth information estimation apparatus 200 may generate a cost volume by combining ID vectors generated by the image data 201 and 202. The depth information estimation apparatus 200 may generate a cost volume by computing weights included in the cost volume generation layer 205 and a 2D feature map.

The normalization layer 206 may include a 3D convolution layer, a plurality of 3D block layers, a high-resolution layer, and a low-resolution layer. For example, the normalization layer 206 may include a U-Net structure proposed based on a fully-convolutional network for image segmentation. Details of each layer are described in FIG. 3. In the normalization layer 206, the depth information 208 estimation apparatus may generate normalized cost volumes in different sizes by normalizing a cost volume. A size, for example, a resolution of a cost volume, may represent a disparity, a height, a width, and a channel of a pixel included in the cost volume.

In the normalization layer 206, the depth information 208 estimation apparatus may extract a normalized feature map of a cost volume from the cost volume. The depth information 208 estimation apparatus may extract the feature map of the cost volume by computing, in the 3D convolution layer, the cost volume based on a weight included in the 3D convolution layer.

In the normalization layer 206, the depth information 208 estimation apparatus may downsample a feature map of a cost volume. The depth information 208 estimation apparatus may generate 4D feature maps having different resolutions by upsampling the downsampled 4D feature map.

In the 3D block layer, the depth information estimation apparatus may encode a feature map of a cost volume. In the low-resolution layer, the depth information estimation apparatus may reduce a size of the feature map of the cost volume by one half by downsampling the encoded feature map of the cost volume and may double a channel of the feature map of the cost volume. The normalization layer 206 may include the plurality of 3D block layers and the low-resolution layer.

The depth information estimation apparatus may iteratively encode and downsample a feature map of a cost volume by a predetermined number of times to identify contexts of the cost volume. The depth information estimation apparatus may encode the final downsampled feature map of the cost volume in the 3D block layer and may upsample the encoded feature map of the cost volume in the high-resolution layer. By upsampling the encoded feature map of the cost volume in the high-resolution layer, a size of the feature map of the cost volume may be doubled and a number of channels of the feature map of the cost volume may be reduced by a half.

The depth information estimation apparatus may iteratively encode a feature map of a cost volume and upsample the encoded feature map of the cost volume by a predetermined number of times to obtain a high-resolution feature map. The depth information 208 estimation apparatus may encode a feature map of a cost volume and may transmit an upsampled feature map of the cost volume to the disparity regression layer 207 when upsampling the encoded feature map of the cost volume. Thus, normalized cost volumes in different sizes may be generated in the normalization layer 206.

The disparity regression layer 207 may include a channel reduction layer and an upsampling layer. In the disparity regression layer 207, the depth information estimation apparatus may estimate disparity information from cost volumes in different sizes. The depth information estimation apparatus may estimate final disparity information by identifying cost volumes in different sizes and different resolutions, determining disparity information from the cost volumes in different sizes respectively, and combining the disparity information.

In the disparity regression layer 207, the depth information estimation apparatus may upsample 3D feature maps to match resolutions of the cost volumes in different sizes. Specifically, the depth information estimation apparatus may reduce a number of channels of the cost volumes in different sizes to 1 in the channel reduction layer. The channel reduction layer may include the 3D convolution layer, and the depth information estimation apparatus may reduce a number of channels of cost volumes in different sizes to 1 by computing a weight included in the channel reduction layer and 4D feature maps from the normalization layer.

The depth information estimation apparatus may perform an operation of the channel reduction layer on each of the cost volumes in different sizes. In addition, the depth information estimation apparatus may process the cost volumes in different sizes such that they have a same size by upsampling the cost volumes on which an operation is performed in the channel reduction layers.

That is, the depth information estimation apparatus may upsample each of the cost volumes in different sizes such that they have a same resolution. The depth information estimation apparatus may estimate disparity information from the upsampled cost volume. Specifically, the disparity information may be estimated from the upsampled cost volume based on Equation 1 shown below.

$$d'_l(j, i) = \sum_{d=0}^{D-1} d * P(-V_l^d(j, i))$$ [Equation 1]

In Equation 1, (j, i) may denote 2D coordinates of a pixel. $d'_l(j, i)$ may denote disparity information of a pixel corresponding to (j, i) for a depth level l. D may denote a total number of disparities. $V_l^d(j, i)$ may represent a 3D feature map for a pixel corresponding to (j, i) and may include (disparity, height, width). P ( ) may be a type of softmax and may be defined by Equation 2 shown below.

$$P(V^d) = \frac{\exp(-V^d)}{\sum_{n=0}^{D-1} \exp(-V^n)}$$ [Equation 2]

In Equation 2, V, d, D may be the same as in Equation 1.

The depth information estimation apparatus may convert disparity information to the depth information 208 based on a focal length of a camera that collects the image data 201 and 202 and a center distance of the camera. For example, when a focal length of a camera is f, a center distance of the camera is b, and an estimated disparity is d, a depth z may be calculated by dividing a product of f and b by d. The depth information estimation apparatus may determine depth information from disparity information using a focal length and a distance between centers of cameras that collect a plurality of image data 201 and 202.

Figure 3:
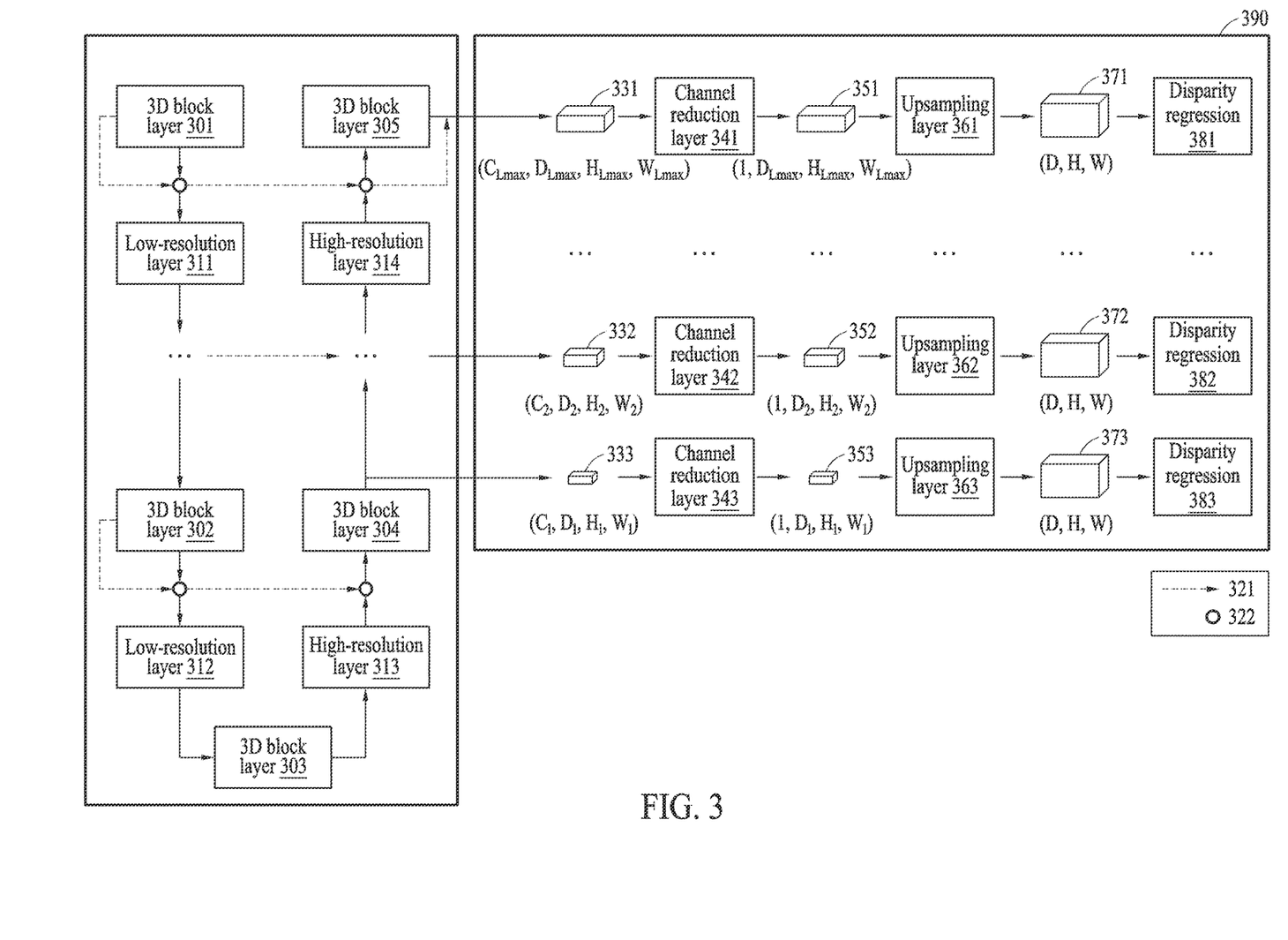
FIG. 3 is a diagram illustrating structures of a normalization layer and an upsampling layer according to an example embodiment.

FIG. 3 is a diagram illustrating structures of a normalization layer and an upsampling layer according to an example embodiment.

A normalization layer 300 may include a plurality of 3D block layers 301 to 305, low-resolution layers 311 and 312, and high-resolution layers 313 and 314. The 3D block layers 301 to 305 may be 3D block layers. A structure of the 3D block layers 301 to 305 is described later in FIG. 4. The depth information estimation apparatus may further include a 3D convolution layer to extract a feature map of a cost volume from the cost volume.

In the normalization layer 300, the depth information estimation apparatus may identify a cost volume and may determine a feature map of the cost volume. Specifically, in the 3D convolution layer, the depth information estimation apparatus may extract a feature map of a cost volume by computing the cost volume and a weight included in the 3D convolution layer.

The depth information estimation apparatus may encode a 3D feature map in the 3D block layer 301. The 3D block layers 301 to 305 may include a plurality of operation layers sequentially processing a batch normalization operation, an activation function operation (for example, a rectified linear unit (ReLU)), a 3D convolution operation, and a dropout operation. For example, a kernel size of the 3D convolution operation may be 3×3×3 and a kernel size of the 3D max pooling may be 2×2×2.

A concatenation operation 322 and a skip connection 321 may be performed on an output result between operation layers. A structure and operation of the 3D block layers 301 to 305 is described in FIG. 4.

The depth information estimation apparatus may downsample a feature map of a cost volume in the low-resolution layers 311 and 312. In the low-resolution layers 311 and 312, the batch normalization operation, the activation function operation (for example, ReLU), the 3D convolution operation, the 3D max pooling operation, and the dropout operation may be sequentially performed on input data. For example, a kernel size of the 3D convolution operation may be 1×1×1 and a kernel size of the 3D max pooling may be 2×2×2.

The depth information estimation apparatus may use an output result processed in the low-resolution layer 312 as input data of the 3D block layer 302 and may iteratively encode and downsample the feature map of the cost volume by a predetermined number of times through the 3D block layers 301 to 303 and the low-resolution layers 311 and 312.

The depth information estimation apparatus may reduce the size and resolution of the feature map of the cost volume by half by downsampling the feature map of the cost volume and may double a number of channel of the feature map of the cost volume.

In the high-resolution layers 313 and 314, the depth information estimation apparatus may generate feature maps, for example, normalized cost volumes in different sizes by upsampling a downsampled feature map of the cost volume. In the high-resolution layers 313 and 314, a 3D transposed convolution operation may be performed on input data. For example, a kernel size of the 3D transposed convolution operation may be 3×3×3.

Specifically, the depth information estimation apparatus may upsample a finally downsampled feature map of the cost volume in the high-resolution layer 313 and may encode the feature map of the cost volume through the 3D block layer 304. That is, the depth information estimation apparatus may use an output result processed in the high-resolution layer 313 as input data of the 3D block layer 304. The depth information estimation apparatus may iteratively encode and upsample the feature map of the cost volume by a predetermined number of times through the 3D block layers 304 and 305 and the high-resolution layers 313 and 314.

In the high-resolution layers 313 and 314, by upsampling the encoded feature map of the cost volume, a size of the feature map of the cost volume may be doubled and a number of channels of a 3D feature map may be reduced by a half.

Referring to FIG. 3, the depth information estimation apparatus may encode a feature map of a cost volume and may transmit an upsampled feature map of the cost volume, for example, normalized cost volumes 331 to 333 in different sizes, to the disparity regression layer 390 when upsampling the encoded feature map of the cost volume. Thus, the normalized cost volumes 331 to 333 in different sizes may be generated in the normalization layer 300. For example, the normalized cost volumes 331 to 333 in different sizes may be the normalized cost volumes 331 to 333 output from a decoder of the normalization layer 300 according to a depth level.

The disparity regression layer 390 may include channel reduction layers 341 to 343 and upsampling layers 361 to 363. In the disparity regression layer 390, the depth information estimation apparatus may estimate disparity information 381 to 383 from the normalized cost volumes 331 to 333.

The depth information estimation apparatus may identify the normalized cost volumes 331 to 333 with different resolutions. The normalized cost volumes 331 to 333 with different resolutions may include a channel (for example, $C_n$ of FIG. 3), a number of disparities (for example, $D_n$ of FIG. 3), a height (for example, $H_n$ of FIG. 3), and a width (for example, $W_n$ of FIG. 3). n may represent a depth level.

The depth information estimation apparatus may determine the disparity information 381 to 383 from the normalized cost volumes 331 to 333 respectively and may estimate final disparity information by combining the disparity information.

The depth information estimation apparatus may reduce a number of channels of the normalized cost volumes 331 to 333 to 1 in the channel reduction layers 341 to 343. In the upsampling layers 361 to 363, the depth information estimation apparatus may upsample the normalized cost volumes 351 to 353 with the number of channels reduced to 1 so that resolutions of the normalized cost volumes 331 to 333 with the number of channels reduced to 1 may match.

The depth information estimation apparatus may modify a number of channels of the normalized cost volumes 331 to 333 to 1 by computing a weight included in the channel reduction layers 341 to 343 and a 3D feature map. The 3D convolution operation may be processed, in the channel reduction layers 341 to 343. For example, a kernel size of the 3D convolution operation may be 3×3×3.

In addition, in the upsampling layers 361 to 363, the depth information estimation apparatus may upsample a 3D feature map to process the normalized cost volumes 351 to 353 in different sizes such that they have a same size. That is, in the upsampling layers 361-363, the depth information estimation apparatus may upsample each of the normalized cost volumes 351 to 353 in different sizes such that they have a same resolution. A trilinear interpolation operation may be processed, in the upsampling layers 361 to 363.

The depth information estimation apparatus may estimate the disparity information 381 to 383 from upsampled normalized cost volumes 371 to 373.

Figure 4:
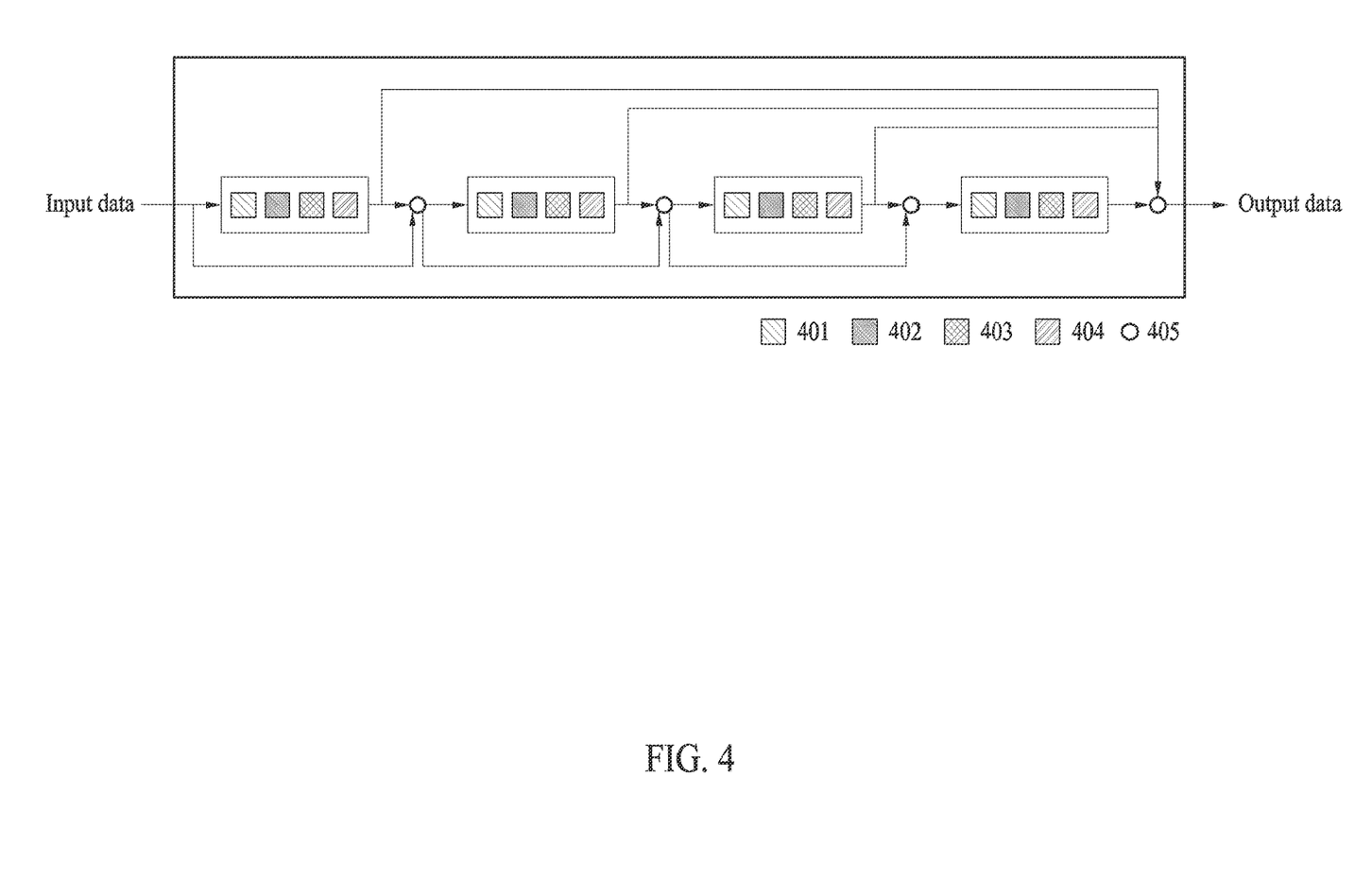
FIG. 4 is a diagram illustrating a structure of a 3D block layer according to an example embodiment.

FIG. 4 is a diagram illustrating a structure of a 3D block layer according to an example embodiment.

A 3D block layer of FIG. 4 may include a plurality of operation layers. In each of the operation layers, a batch normalization 401 operation, an activation function 402 operation, a 3D convolution 403 operation, and a dropout 404 operation may be sequentially operated.

A skip connection and a concatenation operation may be performed on operation results 405 of each of the operation layers to generate final output data. Input data may be a feature map of a cost volume. For example, 16 feature maps may be generated from each of the operation layers and final output data may include 64 feature maps.

Figure 5:
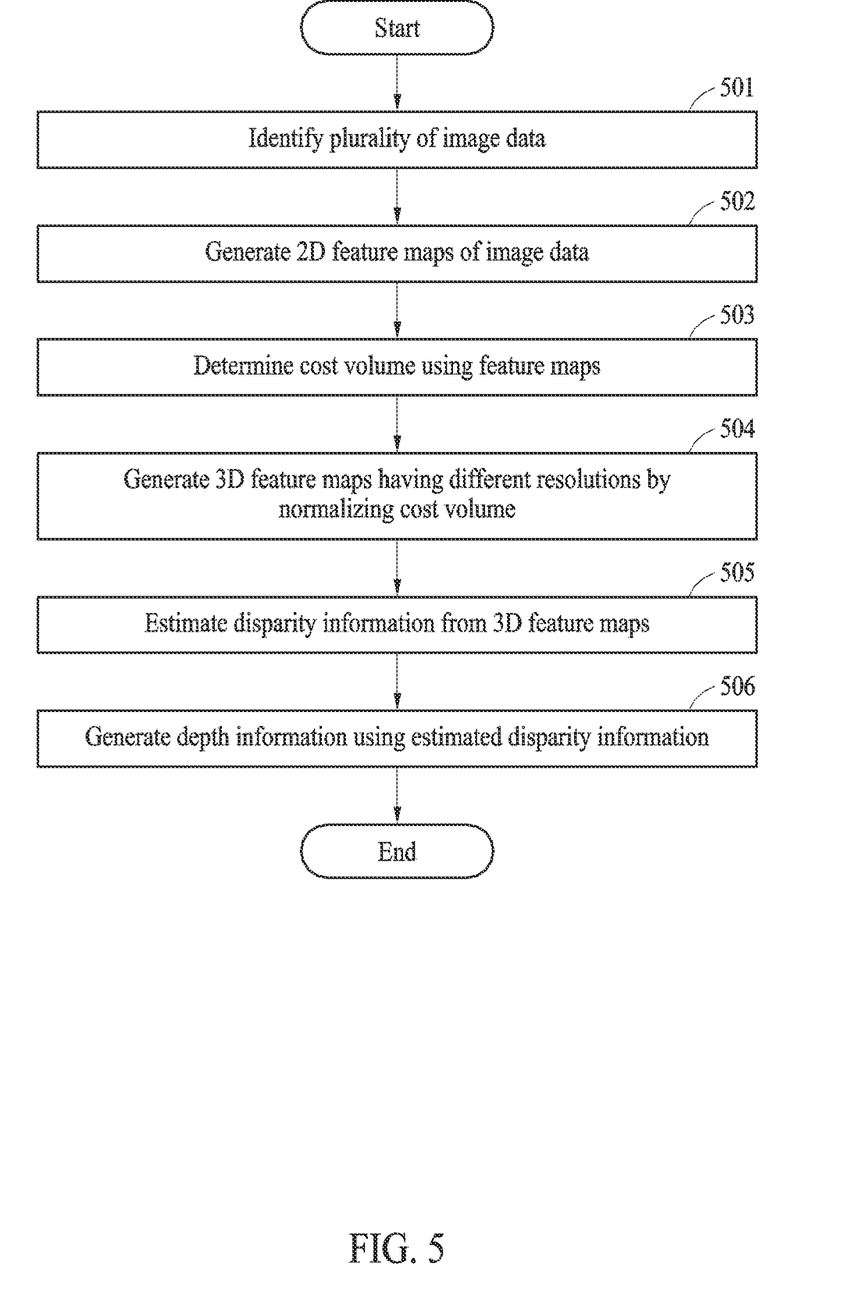
FIG. 5 is a flowchart illustrating a depth estimation method according to an example embodiment.

FIG. 5 is a flowchart illustrating a depth estimation method according to an example embodiment.

In operation 501, the depth information estimation apparatus may identify a plurality of image data. The image data may be 2D images. In an input layer of a learning model, the depth information estimation apparatus may identify the plurality of image data.

In operation 502, the depth information estimation apparatus may generate feature maps of the plurality of image data respectively. In a feature extraction layer, the depth information estimation apparatus may generate the feature maps by performing a 2D convolution operation on the image data.

In operation 503, the depth information estimation apparatus may determine, using the feature maps, a cost volume that represents an intensity difference between the plurality of image data by pixels. The depth information estimation apparatus may generate the cost volume based on feature maps in different sizes wherein the feature maps in different sizes are generated by the feature maps.

In operation 504, the depth information estimation apparatus may generate normalized cost volumes in different sizes by normalizing the cost volume. The depth information estimation apparatus may extract a feature map of the cost volume from the cost volume and may downsample the feature map of the cost volume by iteratively performing a 3D convolution operation and a 3D max pooling operation.

The depth information estimation apparatus may generate feature maps of the cost volumes in different sizes, for example, may generate the normalized cost volumes in different sizes by upsampling the downsampled feature map of the cost volume by a predetermined number of times. The normalized cost volumes in different sizes may have different resolutions.

In operation 505, the depth information estimation apparatus may estimate disparity information from the normalized cost volumes. The depth information estimation apparatus may modify a number of channels of the normalized cost volumes and may upsample. The depth information estimation apparatus may estimate the disparity information using upsampled normalized cost volumes, for example, normalized cost volumes upsampled in a same size. The depth information estimation apparatus may estimate the disparity information applying a softmax function to the upsampled normalized cost volumes.

In operation 506, the depth information estimation apparatus may generate depth information using the estimated disparity information. The depth information estimation apparatus may convert disparity information to depth information using a focal length of a camera and a distance between centers of cameras. A method of converting disparity information to depth information using a focal length of a camera and a distance between centers of cameras is not limited to a specific example, and various methods that one of ordinary skill in the art may easily employ may be applied.

Figure 6:
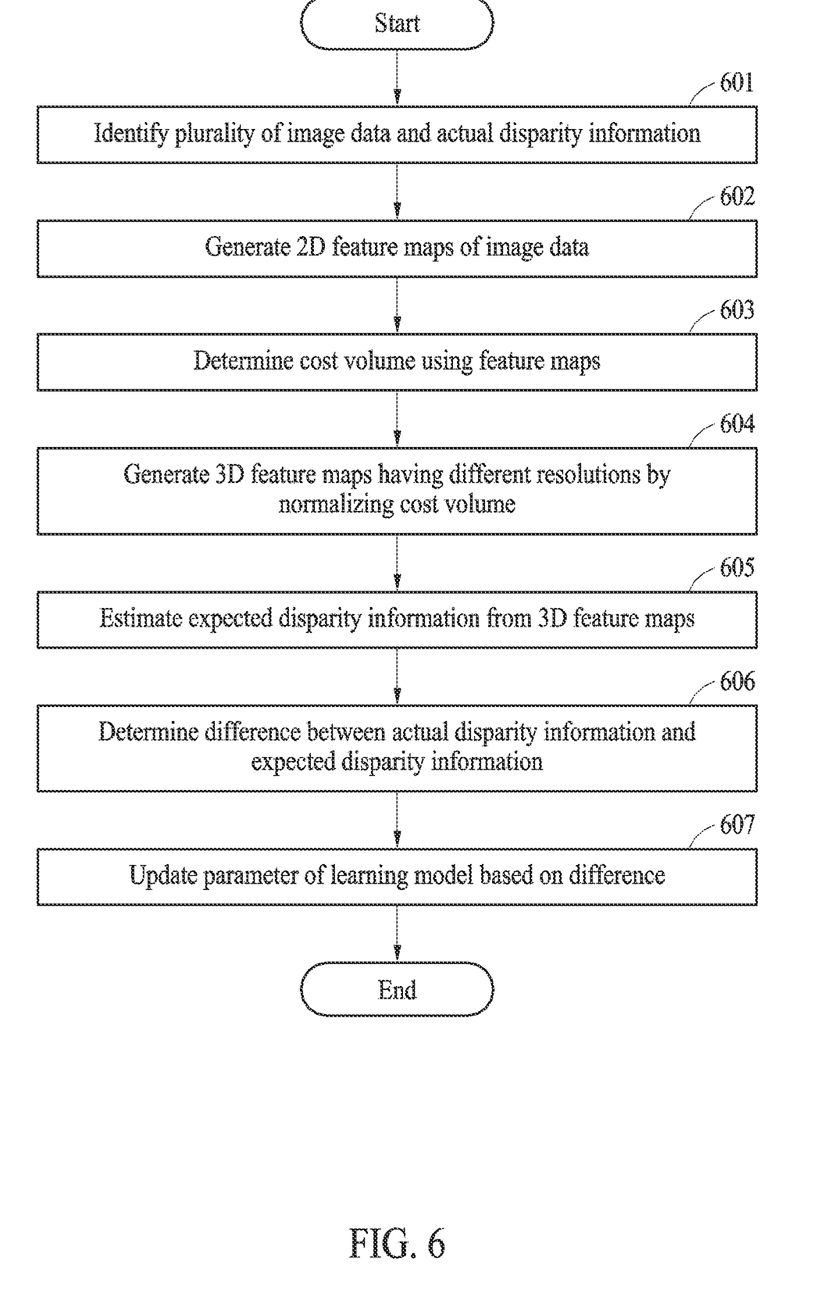
FIG. 6 is a flowchart illustrating a method of training a learning model according to an example embodiment.

FIG. 6 is a flowchart illustrating a method of training a learning model according to an example embodiment.

In operation 601, the depth information estimation apparatus may identify a plurality of image data and actual disparity information.

In operation 602, the depth information estimation apparatus may generate feature maps of the image data respectively. In operation 603, the depth information estimation apparatus may determine a cost volume using the feature maps.

In operation 604, the depth information estimation apparatus may generate normalized cost volumes having different sizes by normalizing a cost volume. In operation 605, the depth information estimation apparatus may estimate disparity information from the normalized cost volumes.

In operation 606, the depth information estimation apparatus may determine a difference between actual disparity information and expected disparity information. Specifically, the depth information estimation apparatus may determine a loss value for the difference between the actual disparity information and the expected disparity information. The actual disparity information may be a ground truth determined by depth information of actual image data and the expected disparity information may be predicted disparity information according to the present disclosure.

For example, the loss value may be determined by Equation 3 shown below.

$$\text{Loss} = \lambda_1 * \text{loss}_1 + \lambda_2 * \text{loss}_2 + \ldots + \lambda_{L_{max}} * \text{loss}_{L_{max}} \qquad \text{[Equation 3]}$$

may denote hyperparameters, and $L_{max}$ may denote a maximum depth level. $\text{loss}_n$ may denote a loss for a difference between actual disparity information and expected disparity information when a depth level is n, and Loss may denote a final loss value. The depth information estimation apparatus may update weights of a learning model to minimize the final loss value. $\text{loss}_n$ may be determined by Equation 4 shown below.

$$\text{loss}_i = \frac{1}{N} \sum_{j=0}^{H} \sum_{i=0}^{W} SmoothedL_1(d'_l(j, i) - d_l(j, i)) \qquad \text{[Equation 4]}$$

In Equation 4, $SmoothedL_n$ may denote a loss function and may be determined by Equation 5 shown below. $d'_l(j, i)$ may denote expected disparity information of a pixel corresponding to (j, i) for a depth level l. $d_l(j, i)$ may denote actual disparity information of a pixel corresponding to (j, i) for a depth level l. H may be a height and W may be a width.

$$SmoothedL_1(y) = \begin{cases} 0.5y^2 & \text{if } y < 1 \\ |y| - 0.5 & \text{otherwise.} \end{cases} \qquad \text{[Equation 5]}$$

In Equation 5, y may denote a difference between actual disparity information and expected disparity information. In operation 607, the depth information estimation apparatus may update a weight of a learning model based on the difference between the actual disparity information and the expected disparity information. The depth information estimation apparatus may train the learning model of the present disclosure in an end-to-end manner.

In addition, Tables 1 to 3 below indicate experimental results using three data sets (for example, KITTI 2012, KITTI 2015, and Scene Flow) for comparing the present disclosure and conventional technologies. In Tables 1 to 3, DC3DC represents a result of using a learning model proposed of the present disclosure and the others are results of using conventional technologies.

TABLE 1

| Methods | Error Rt. (2 px) | Error Rt. (3 px) | Reflec. Reg. (3 px) | Avg-All (end-pt.) |
|---|---|---|---|---|
| DispNetC [4] | 7.38% | 4.11% | 16.04% | 0.9 px |
| MC-CNN$_{acrt}$ [28] | 3.90% | 2.43% | 17.09% | 0.7 px |
| GCNet [3] | 2.71% | 1.77% | 10.80% | 0.6 px |
| MSDC-Net [8] | 2.71% | 1.63% | 9.16% | 0.5 px |
| iResNet-i2 [29] | 2.69% | 1.71% | 7.40% | 0.5 px |
| SagStereo [16] | 2.66% | 1.68% | 6.35% | 0.5 px |
| PSMNet [5] | 2.44% | 1.49% | 8.36% | 0.5 px |
| GA-Net [6] | 2.18% | 1.36% | 7.87% | 0.5 px |
| GwcNet-gc [20] | 2.16% | 1.32% | 7.80% | 0.5 px |
| SSPCVNet [30] | 2.47% | 1.47% | 7.56% | 0.5 px |
| AcfNet [27] | 1.83% | 1.17% | 6.93% | 0.5 px |
| NLCA-Net [31] | 1.97% | 1.22% | 8.78% | 0.4 px |
| AANet [26] | 2.90% | 1.91% | 10.51% | 0.5 px |
| DC3DCNet$_{67}$ | 2.05% | 1.27% | 7.32% | 0.5 px |
| DC3DCNet$_{103}$ | 1.89% | 1.16% | 5.88% | 0.4 px |
| DC3DCNet$_{103}$* | 1.97% | 1.19% | 5.65% | 0.4 px |

Table 1 shows an experimental result when a data set is KITTI 2012.

TABLE 2

| | Non Occlusion | | All Areas | |
|---|---|---|---|---|
| Methods | Foreground | Avg All | Foreground | Avg All |
| GCNet [3] | 5.58% | 2.61% | 6.16% | 2.87% |
| PSMNet [5] | 4.31% | 2.14% | 4.62% | 2.32% |
| GA-Net [6] | 3.39% | 1.84% | 3.91% | 2.03% |
| GwcNet [20] | 3.49% | 1.92% | 3.93% | 2.11% |
| SSPCVNet [30] | 3.40% | 1.91% | 3.89% | 2.11% |
| AcfNet [27] | 3.49% | 1.72% | 3.80% | 1.89% |
| NLCA-Net [31] | 3.52% | 1.66% | 3.78% | 1.83% |
| AANet [26] | 4.93% | 2.32% | 5.39% | 2.55% |
| DC3DCNet$_{67}$ | 3.21% | 1.94% | 3.75% | 2.16% |
| DC3DCNet$_{103}$ | 3.34% | 1.86% | 3.69% | 2.04% |

Table 2 shows an experimental result when a data set is KITTI 2015.

TABLE 3

| Method | $E_{EPE}$ ($\downarrow$) |
|---|---|
| DispNetC [4] | 2.68 |
| GCNet [3] | 2.51 |
| CRL [25] | 1.32 |
| PSMNet [5] | 1.09 |
| AANet [26] | 0.87 |
| AcfNet [27] | 0.87 |
| GA-Net [6]$^2$ | 0.84 |
| FADNet [18] | 0.83 |
| Gwc-Net [20] | 0.77 |
| DC3DCNet$_{67}$ | 0.76 |
| DC3DCNet$_{103}$ | 0.76 |
| DC3DCNet$_{103}$* | 0.74 |

Table 3 shows an experimental result when a data set is Scene Flow.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory; erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A depth information estimation method comprising:
   identifying a plurality of image data;
   generating feature maps of the plurality of image data respectively;
   generating a cost volume using the feature maps;
   generating normalized cost volumes having different resolutions from each other by normalizing the cost volume;
   estimating disparity information from the normalized cost volumes; and
   generating depth information using the estimated disparity information,
   wherein the generating of the normalized cost volumes in different sizes comprises:
      extracting a feature map of the cost volume from the cost volume;
      downsampling the feature map of the cost volume; and
      generating the normalized cost volumes in different sizes by upsampling the downsampled feature map of the cost volume, and
   wherein the generating of the cost volume comprises generating the cost volume by processing the feature maps using a spatial pyramid pooling module.

2. The depth information estimation method of claim 1, wherein the estimating of the disparity information comprises:
   reducing a number of channels of the normalized cost volumes and upsampling to match resolutions of the normalized cost volumes; and
   determining the disparity information using the upsampled normalized cost volumes.

3. The depth information estimation method of claim 1, wherein the generating of the depth information comprises converting the disparity information to the depth information based on a focal length of a camera that collects the image data and a center distance between cameras.

4. A method of training a learning model used for a depth information estimation method, the method comprising:
   identifying a plurality of image data and actual disparity information of the plurality of image data;
   generating feature maps of the plurality of image data respectively;
   generating a cost volume using the feature maps;
   generating normalized cost volumes having different resolutions from each other by normalizing the cost volume;
   estimating expected disparity information from the normalized cost volumes;
   determining a difference between the actual disparity information and expected disparity information; and
   updating a weight of the learning model based on the difference,
   wherein the generating of the normalized cost volumes having different resolutions comprises:
      extracting a feature map of the cost volume from the cost volume;
      downsampling the feature map of the cost volume; and
      generating the normalized cost volumes having different resolutions by upsampling the downsampled feature map of the cost volume, and
   wherein the generating of the cost volume comprises generating the cost volume by processing the feature maps using a spatial pyramid pooling module.

5. The method of claim 4, wherein the generating of the cost volume comprises generating the cost volume by processing the feature maps using a spatial pyramid pooling module.

6. The method of claim 4, wherein the estimating of the disparity information comprises:
   upsampling the normalized cost volumes to match resolutions of the normalized cost volumes; and
   determining the disparity information using the upsampled normalized cost volumes.

7. A depth information estimation apparatus comprising:
   a processor,
   wherein the processor is configured to identify a plurality of image data, generate feature maps of the plurality of image data respectively, determine a cost volume using the feature maps, generate normalized cost volumes having different resolutions from each other by normalizing the cost volume, estimate disparity information from the normalized cost volumes, and generate depth information using the estimated disparity information,
   wherein the processor is configured to extract a feature map of the cost volume from the cost volume downsample the feature maps of the cost volume, and generate the normalized cost volumes having different resolutions by upsampling the feature maps of the downsampled cost volumes, and
   wherein the generating of the cost volume comprises generating the cost volume by processing the feature maps using a spatial pyramid pooling module.

8. The depth information estimation apparatus of claim 7, wherein the processor is configured to generate the cost volume by processing the feature maps using a spatial pyramid pooling module.

9. The depth information estimation apparatus of claim 7, wherein the processor is configured to upsample the normalized cost volumes to match resolutions of the normalized cost volumes, and determine the disparity information using the upsampled normalized cost volumes.

10. The depth information estimation apparatus of claim 7, wherein the processor is configured to convert the disparity information to the depth information based on a focal length of a camera that collects the image data and a center distance between cameras.

11. The depth information estimation method of claim 1, wherein the plurality of image data comprises first image data captured via a first camera having a first viewpoint of a scene at an instant in time and second image data captured via a second camera having a second viewpoint of the scene at the instant in time, the second viewpoint being different from the first viewpoint.

12. The method of claim 4, wherein the plurality of image data comprises first image data captured via a first camera having a first viewpoint of a scene at an instant in time and second image data captured via a second camera having a second viewpoint of the scene at the instant in time, the second viewpoint being different from the first viewpoint.

13. The depth information estimation apparatus of claim 7, wherein the plurality of image data comprises first image data captured via a first camera having a first viewpoint of a scene at an instant in time and second image data captured via a second camera having a second viewpoint of the scene at the instant in time, the second viewpoint being different from the first viewpoint.

* * * * *